United States Patent [19]

Linker et al.

[11] Patent Number: 4,874,075

[45] Date of Patent: * Oct. 17, 1989

[54] SWITCH TRACK ASSEMBLY FOR HIGH-SPEED HANDLING OF ELECTRONIC COMPONENTS

[75] Inventors: Frank V. Linker; Frank V. Linker, Jr., both of Broomall, Pa.

[73] Assignee: American Tech Manufacturing Corp., Erlanger, Ky.

[*] Notice: The portion of the term of this patent subsequent to May 19, 2004 has been disclaimed.

[21] Appl. No.: 273,108

[22] Filed: Nov. 16, 1988

Related U.S. Application Data

[63] Continuation of Ser. No. 49,437, May 14, 1987, abandoned, which is a continuation of Ser. No. 866,222, May 22, 1986, Pat. No. 4,705,152.

[51] Int. Cl.$^4$ .............................................. B65G 11/20
[52] U.S. Cl. ........................................ 193/39; 209/573
[58] Field of Search ................... 193/39, 13, 28, 31 R, 193/31 A, 36, 39; 209/573, 574; 198/442

[56] References Cited

U.S. PATENT DOCUMENTS

| | | | |
|---|---|---|---|
| 405,088 | 6/1889 | Ferguson | 193/31 A |
| 3,727,757 | 4/1973 | Boissicat | 209/573 |
| 3,896,935 | 7/1975 | Hjelle et al. | 209/573 |
| 4,410,227 | 10/1983 | Prunella et al. | 209/573 X |
| 4,506,704 | 3/1985 | Boom et al. | 193/31 R |
| 4,665,954 | 5/1987 | Linker et al. | 209/573 X |
| 4,705,152 | 11/1987 | Linker et al. | 193/39 |

Primary Examiner—Frank E. Werner
Assistant Examiner—Lyle K. Kimms
Attorney, Agent, or Firm—Eugene E. Renz, Jr.

[57] ABSTRACT

A switch track mechanism for selectively directing electronic components from a single trackway to one of a plurality of discharge or accumulator stations comprising a first fixed track sections adjacent the trackway, a second fixed track section adjacent to and downstream of the first fixed track section, movable first and second track members operatively associated with the first and second fixed track sections and each operable between first and second limit positions. The second movable track member has a plurality of track sectors disposed in an array, a plurality of accumulator stations downstream of the second track member corresponding in number to the number of track sectors, a cartridge for electronic components is mounted at each accumulator station. The movable track sections have actuable between limit positions whereby electronic components may be directed from the single trackway to a select one of the accumulator stations.

1 Claim, 6 Drawing Sheets

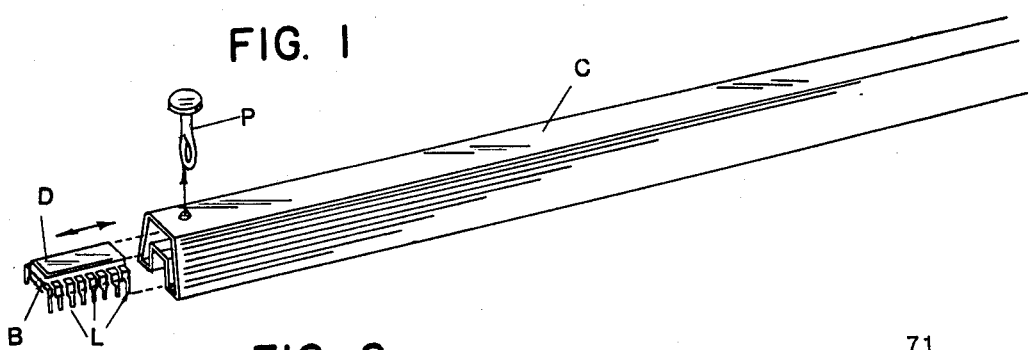
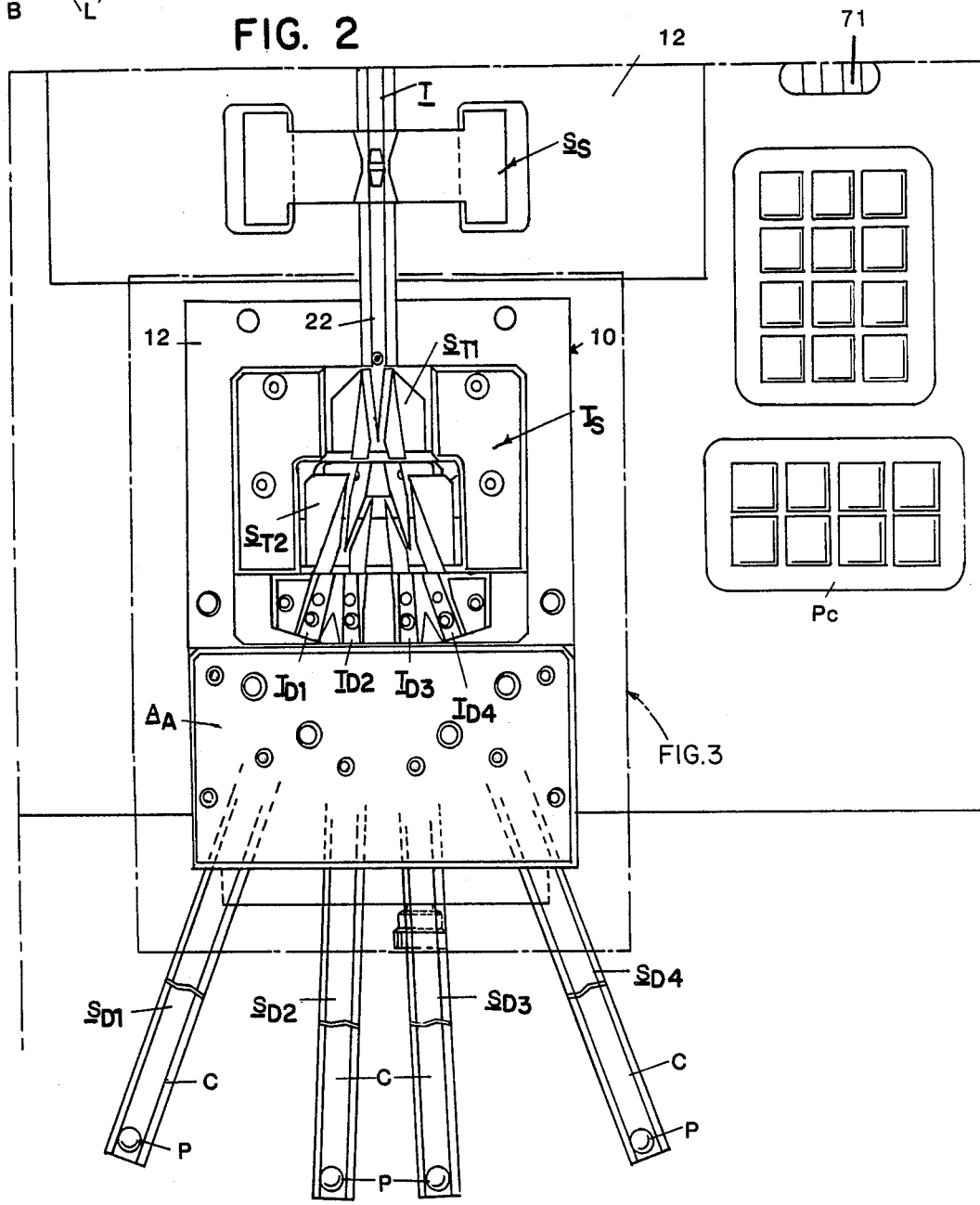

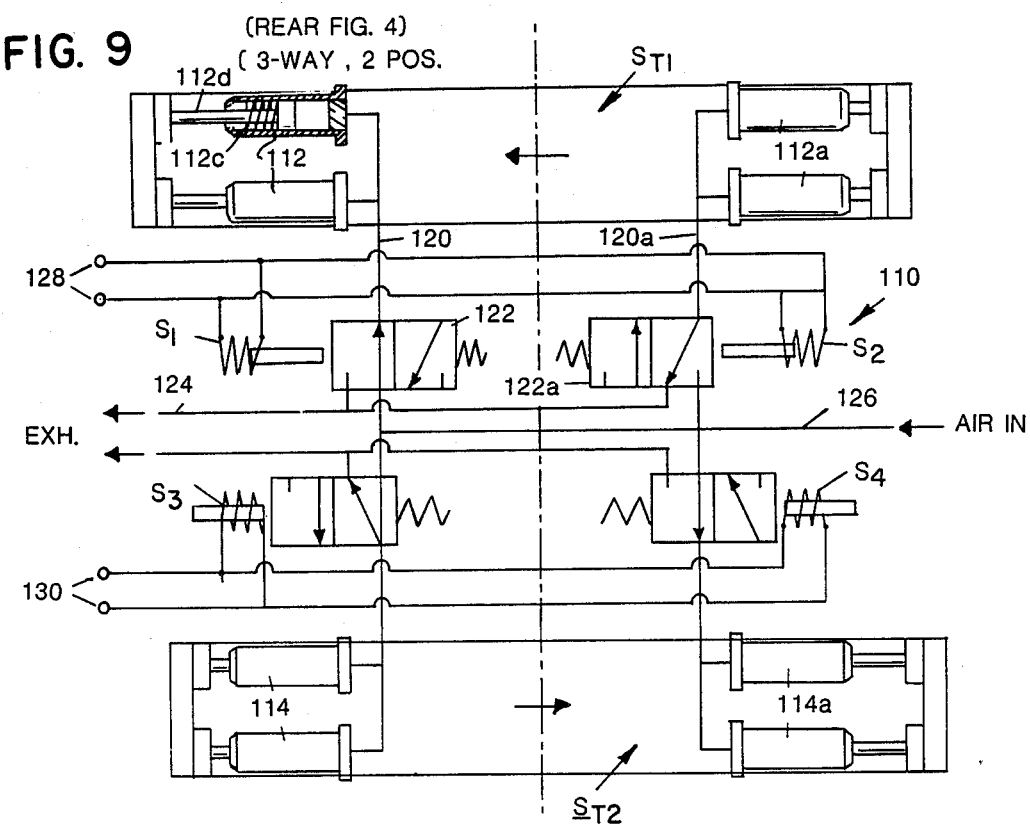
FIG. 9 (REAR FIG. 4) (3-WAY, 2 POS.)
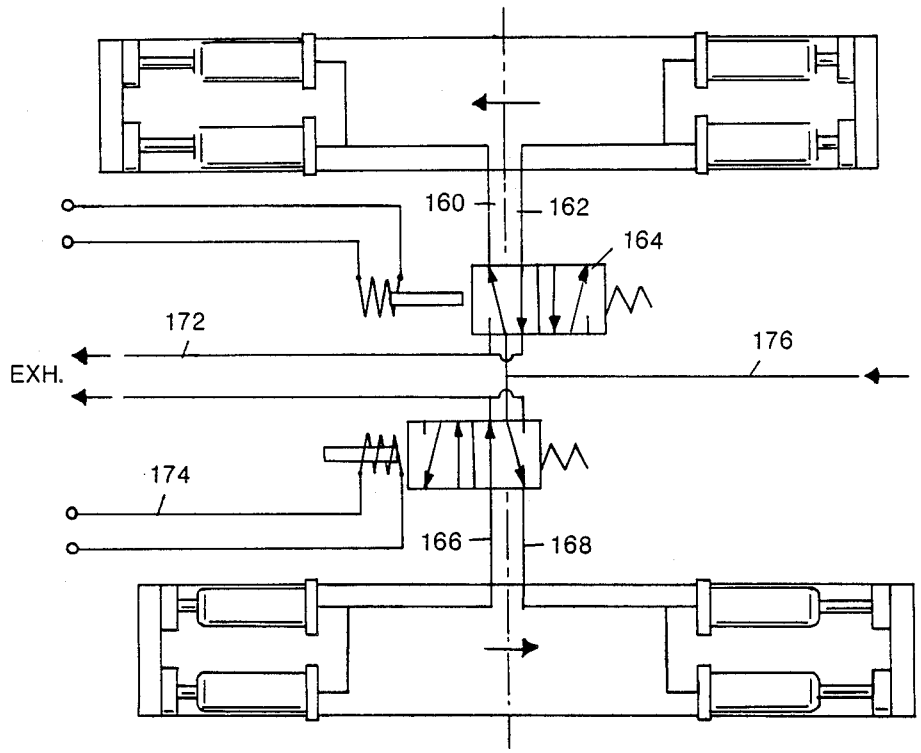
FIG. 10 (MODIFICATION, n 4-WAY, TWO PDS. (REAR FIG. 4)

SWITCH TRACK ASSEMBLY FOR HIGH-SPEED HANDLING OF ELECTRONIC COMPONENTS

This is a continuation of abandoned copending application Ser. No. 07/049,437 filed on May 14, 1987 which was a continuation application of Ser. No. 866,222 filed May 22, 1986 now U.S. Pat. No. 4705152.

FIELD OF THE INVENTION

The present invention relates to broadly to new and improved method and apparatus for handling electronic components and is particularly adapted for the components commonly referred to as dual-in-line packages or DIP devices. More specifically, the invention relates to a novel switch track arrangement for high-speed handling and separation of DIP devices to a plurality of discharge stations.

BACKGROUND OF THE INVENTION

DIP devices of the type to which the present invention generally include a plurality of pin-like projections or leads which are relatively fragile and have a tendency to bend or otherwise to become damaged during handling and shipment. Such damage can distort the leads from a given predetermined orientation necessary for proper installation into a PCB.

Method and apparatus are previously known for straightening these electronic components so that they are oriented properly for installation. The prior art lead straighteners are as described in U.S. Pat. No. 3,880,205 entitled METHOD AND APPARATUS FOR STRAIGHTENING LEAD COMPONENTS issued Apr. 29, 1975 and U.S. Pat. No. 4,481,984 entitled ELECTRONIC COMPONENT LEAD STRAIGHTENING DEVICE AND METHOD issued Nov. 13, 1984, owned by the assignee of the present application. The apparatus shown in these patents operates to correct erroneous disposition of leads and/or straighten bent leads by applying a combing action to the leads. The assignee of the present application, also has a pending application entitled HIGH-SPEED ELECTRONIC COMPONENT LEAD FORMING APPARATUS AND METHOD S. N. 710,032, filed Mar. 11, 1985 showing a system for scanning leads and also showing switching mechanism for use in lead straightening and scanning apparatus.

While these prior apparatus were generally effective for the purposes intended, it has been found that the capacity for handling DIPs is limited. For example, in some instances, the capacity is dependent on the cycling speed of the straightening mechanism. In other instances, it was dependent on the configuration, arrangement and operation of the various feed mechanisms for delivering DIP devices through the system. In still other instances, all of the apparatus functions were performed on each DIP device delivered to the system. It has been found that some of the DIP devices in the packages do not require straightening or alignment. Accordingly, in systems where each DIP device was passed through a straightening or aligning apparatus, the overall speed and the quantity per time unit was limited. Furthermore, even if the systems were discriminating, the switching mechanisms were somewhat limited.

With the foregoing in mind, it is an object of the present invention to provide a high-speed switching apparatus for general use in DIP handling apparatus. For example, the switching apparatus and method of the present invention may be utilized solely in conjunction with a scanning device to selectively separate DIP devices which require no straightening or aligning operation from those which do. The switching apparatus may also be utilized in conjunction with existing lead straightening machines of the "300" or "600" category to thereby speed up the production rate of this equipment. It has been observed that utilized strictly with a scanning device, the switching apparatus has a capability of directing DIP devices selectively to one of four discharge stations at a rate in excess of between 15,000 to 20,000 DIPs per hour.

SUMMARY OF THE INVENTION

Summarizing briefly, the purpose of the invention is to provide a new and novel apparatus and method for high-speed handling of DIP devices and specifically to a novel high-speed accept/reject switching mechanism. The switching mechanism of the present invention may be utilized as a pre-sorting unit in combination with a scanning device simply to separate at a high-speed rate DIPs requiring further straightening or forming processing and those which do not require any further processing. It may also be used and easily adapted to an existing lead straightening system or apparatus of the type illustrated, for example, in the patents set forth above. In this conjunction, the switching mechanism may be positioned adjacent the discharge end of an existing trackway with or without the addition of an additional scanning device. Considering the basic components of the switching apparatus and system and with particular reference to the broad functional and operational features thereof, the system includes, in the present instance, two trackway sections at the discharge end of a single trackway emanating from a scanning device or from a lead straightener which are adapted for reciprocating transverse movement between opposite limit positions in a variety of combinations to direct DIP devices selectively to one of four discharge stations located downstream of the switching trackway sections. More specifically, the switching trackway sections discharge for an array of four fixed traffic blocks which in turn communicate with an output adaptor assembly which detachably supports four cartridges or tubes for DIPs. The operation of the entire system is under the control of a preprogrammed logic circuit wherein the parameters are keyed into the logic by an operator.

Describing the overall operation summarily, DIPs in cartridges are fed to an inclined trackway where they fall by gravity past a scanning station disposed closely adjacent the high-speed switch tracing device of the switch tracking apparatus of the present invention. Each DIP passing through the scanning station will be guided into one of four carrier tubes after the leads have been monitored by the scanning heads and the high-speed switch track activated to align the discharge trackway with a desired discharge station via the preprogrammed logic circuit and the parameters keyed into the logic by an operator. For example, station 1 may be programmed to receive DIPs requiring straightening; station 2 may be programmed to accept DIPs which do not require straightening but simply alignment; and stations 3 and 4 are programmed to accept DIPs which do not require straightening or alignment as determined by the monitoring at the scanning station.

The apparatus includes other features facilitating a high-speed operation. For example, the output adaptor assembly has a plurality of indicator lamps which are normally off to indicate that a tube or cartridge for receiving DIPs is mounted in place ready to receive DIPs delivered thereto and which will blink when the tube is filled to capacity so that an operator can quickly replace the tube and facilitate the high-speed operation. The lamps also blink to indicate a jam condition. An air-operated stop pin is located upstream of the switching track mechanism which is actuatable between a retracted position permitting flow of DIPs to the various discharge stations and a raised position blocking passage thereto under certain conditions as determined by the logic circuit, for example, jamming of DIPs in the system.

Other features of the present invention include a unitary actuator module for the movable switch track sections which includes air operated piston cylinder actuators which are normally spring biased inwardly toward a central position thereby providing a large clearance between the outer terminal ends of the pistons and a stop wall in the housing which they confront. In this way, the switch track actuator module is easy to assemble and remove and there are no critical clearances or tolerances which are required for accurate actuation of the switch track sections between various limit positions which directs the DIPs selectively to one of the four discharge stations. Essentially there are only two fastening means which hold the actuator module assembly in place. Thus, the entire assembly is very easy to replace when desired or needed.

The output adaptor assembly also includes a novel spring biasing arrangement for seating the cartridges firmly in place in the channels formed therein which spring also includes a bumper element which aligns with the fixed traffic blocks guiding DIPs from the movable switch actuators to the discharge or accumulator station when a cartridge is not in place at the discharge station to receive DIPs. Insertion of a cartridge or tube into the socket of the magazine retainer subassembly automatically displaces the bumper to a position permitting flow of DIPs into a cartridge at the discharge station.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a perspective view of a plastic DIP carrier tube, its associated retaining pin and a typical DIP carried within the tube;

FIG. 2 is a fragmentary plan view showing a centrally located trackway to direct DIPs to a scanning station, closely followed by a high-speed switch track device and an integral four tube output adaptor assembly whereby each incoming DIP will be guided into one of the four carrier tubes after its leads have been monitored by the scanning heads and the high speed switch track activated to the desired tube by means of the preprogrammed logic circuits and the parameters keyed into the logic by the operator on the operator control panels adjacent the foregoing assemblies;

FIG. 9 is a schematic view of the four 3-way 2-position solenoid operated air valves shown as an integral module in FIG. 6, the associated air delivery and exhaust lines, the electrical connections tied into the logic system of the scanner (not shown) to independently actuate the upper or lower switch track carrier plates, the eight miniature air operated spring biased air cylinders and their actuators, one of which is shown in section; and FIG. 10 is a schematic view similar to FIG. 9 but utilizing a module consisting of two 4-way, 2 position solenoid operated air valves.

DETAILED DESCRIPTION OF THE PREFERRED EMBODIMENTS

FIG. 1 shows the type of electronic component for which the apparatus and method of the present invention are particularly suited and a form of cartridge C in which they are housed. These electronic components commonly known in the trade as dual-in-line devices are hereinafter referred to as DIP devices. The DIPs are generally designated by reference letter D and comprise an elongated, generally rectangular body portion B made of a molded material such as a ceramic or plastic having imbedded therein a plurality of leads L which ideally are uniformly spaced and in an acceptable device are generally parallel to a plane perpendicular to their longitudinal axis. These cartridges C typically have a pin or plug P which is easily removable for normally retaining the DIP devices inside the cartridge and for permitting discharge of the DIP devices when desired simply by removing the pin either manually or by automatic means.

A general understanding of the basic structure and operation of the novel switch mechanism will be discussed first with reference to several of the views which best show the basic components of the apparatus and the operation thereof such as FIGS. 2, 3 and 4. Considering now the basic components of the apparatus in terms of function, the switching apparatus shown in FIG. 2 comprises a main housing 10 which has an inclined front panel 12 supporting an external, elongated trackway T having at its upper terminal end thereof a loading station (not shown) for receiving filled cartridges C of the type illustrated in FIG. 1 for DIPs to be checked for lead straightness and alignment. The loading station may include a turret feed for plurality of cartridges wherein one of the DIP carry tubes is always aligned with the trackway T while the other DIP carrying tubes are held in reserve so that as one tube is discharging DIPs, the other can be filled and thereafter rotated to align with the trackway and thereby aid in high-speed processing of DIPs. DIPs are gravity fed along the trackway T pass through a scanning station $S_S$. The switch track mechanism $T_S$ located downstream of the scanning station $S_S$ comprising two laterally movable switch tracks $S_{T1}$ and $S_{T2}$. These switch tracks are selectively actuatable between selected limit positions to direct incoming DIPs to one of, in the present instance, four fixed discharge trackways $T_{D1}$, $T_{D2}$, $T_{D3}$ and $T_{D4}$. An output adaptor assembly $A_A$ is mounted adjacent the fixed discharge trackways and includes means for supporting therein cartridges of the type illustrated in FIG. 1.

Figure 3:
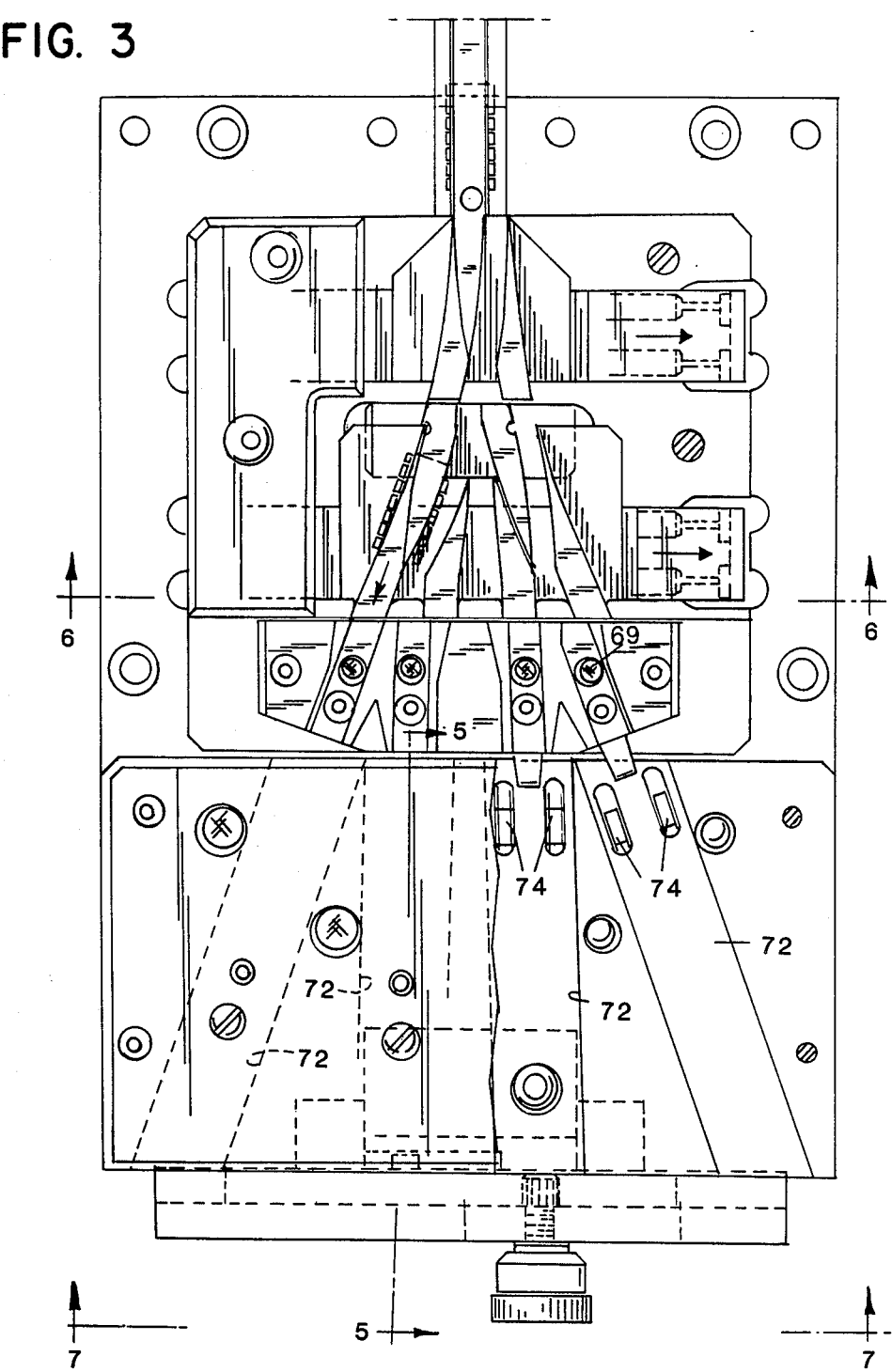
FIG. 3 is an enlarged plan view of the high speed four-way switch track assembly and its associated 4 socket output tube adaptor enclosed within the dot and dash box of FIG. 2 and designated FIG. 3 showing some details of construction of the switch track assembly.
Figure 4:
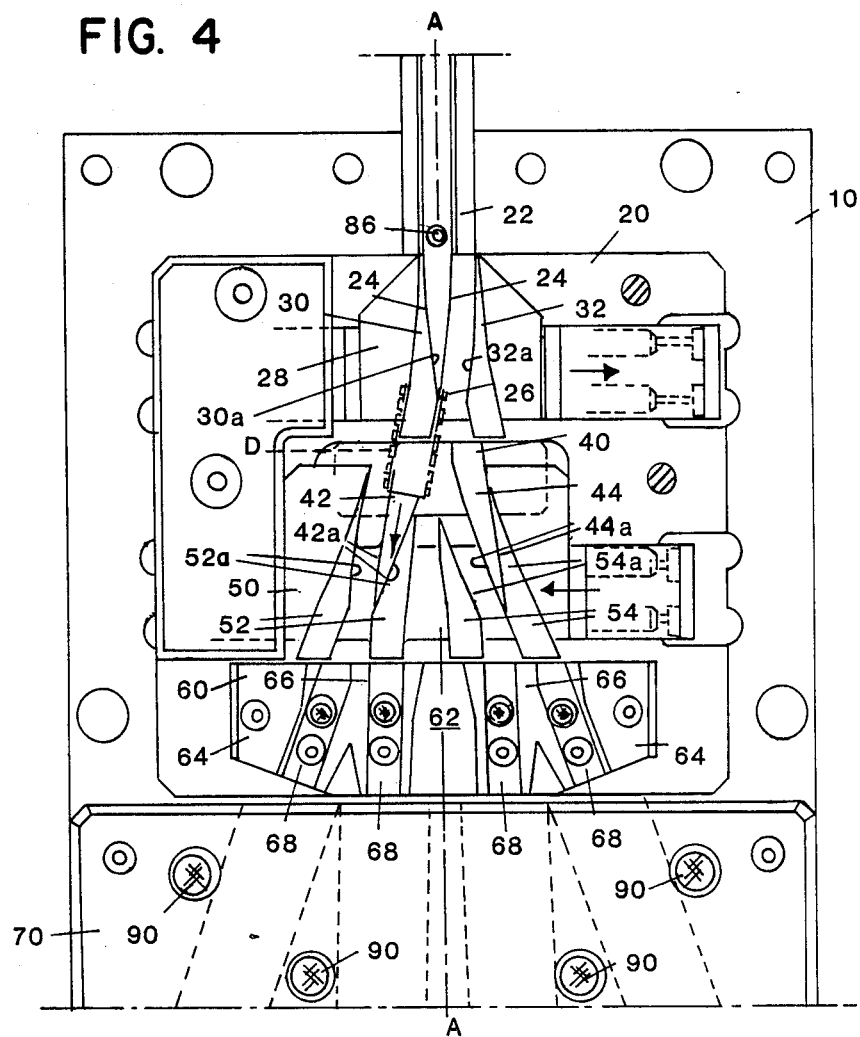
FIG. 4 is a fragmentary view similar to FIG. 3 but showing the switch track actuated to deliver an incoming DIP, shown in dot and dash lines to the second tube position of the output tube adaptor assembly. Delivery of DIPs to the other tube positions is accomplished by a similar combination of track switching as illustrated in FIGS. 3 and 4.

Considering now briefly the operation of the system and with particular referenced to FIGS. 2, 3 and 4, DIPs flow by gravity from the loading station along the trackway T through the scanning station $S_S$ which is operatively connected via preprogrammed logic circuits having parameters keyed into the logic by an operator on the operator control panel $P_C$ to selectively direct DIPs to one of the four discharge stations $S_{D1}$–$S_{D4}$. For example, the program may call for and direct DIPs requiring a straightening operation as determined at the scanning station to discharge stations $S_{D1}$, $S_{D2}$ and to direct DIPs which do not require any straightening or aligning operations to discharge stations $S_{D3}$ and $S_{D4}$. Movement of the DIPs in this fashion is controlled by operation of the movable switch tracks $S_{T1}$ and $S_{T2}$ between limit positions under the guidance and control of the logic circuit as determined by the readings generated at the scanning station $S_S$. For example, in FIG. 3, the switching tracks are actuated to limit positions operable to direct DIPs to the first discharge station $S_{D1}$ and in this position the switch tracks are both actuated to the rightmost limit position. On the other hand in FIG. 4, the switch tracks $S_{T1}$ and $S_{T2}$ are in the position to direct DIPs to the second discharge station $S_{D2}$.

As explained in more detail below, there are other features of the switching mechanism of the present invention including a spring biased carrier tube retaining means, microswitch carrier tube inserted or pocket empty sensing means and vertical height adjustment means to adjust the height of the cover tube opening so that it lies in a common plane with the DIP traffic track.

Figure 5:
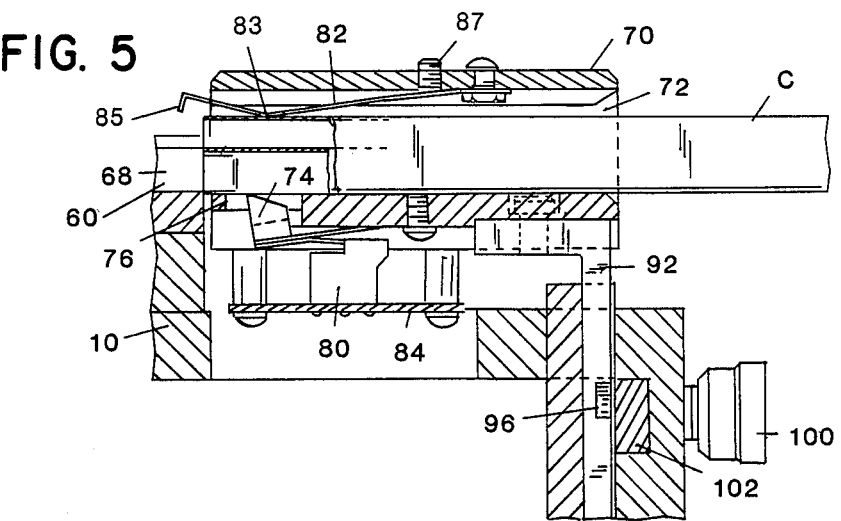
FIG. 5 is a fragmentary sectional elevational view taken on the lines 5—5 of FIG. 3 showing additional details of construction of the output tube holder adaptor assembly, spring biased plastic carrier tube retaining means, microswitch carrier tube inserted or pocket empty sensing means and vertical height adjustment means to adjust the height of the carrier tube opening into a common plane with the DIP traffic track.
Figure 6:
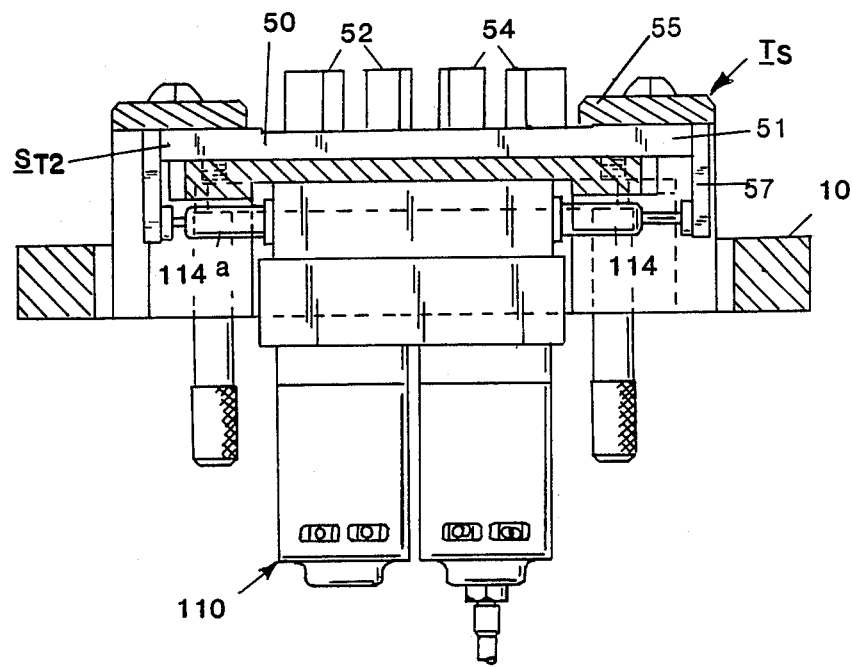
FIG. 6 is a sectional elevational view taken on the line 6—6 of FIG. 3 showing additional details of construction of the switch track assembly, actuatable lower switch track plate, air cylinders and spring biased actuators, some mounting details of the four three-way, two position solenoid operated air valves, module.

Considering now more specifically the switch track mechanism and with particular reference to FIGS. 4, 5 and 6, the mechanism includes a switch track housing 20 mounted on the front panel, a fixed entrance track section 22 supported adjacent the upper end of the housing and adapted to be aligned with the main trackway T. The entrance track section 22 as illustrated has arcuate sides 24 which converge to a pointed tip portion 26. An upper movable switch track 28 straddles the entrance track section 22 and is mounted in the housing for lateral transverse movement relative thereto between opposing limit positions. The upper movable switch track section 28 comprises a pair of track segments or sectors 30 and 32 spaced apart and diverging outwardly having confronting arcuate side walls 30a and 32a which conform to the curvature of the arcuate side wall of the fixed entrance track section and operable in each limit position to form with the entrance track section a continuous extension of trackway T as illustrated, for example, FIGS. 3 and 4. The switch track assembly further includes a fixed lower switch track section 40 comprising as illustrated a pair of spaced apart track segments 42, 44 equispaced from the central longitudinal line A—A of the trackway and each having, as illustrated, arcuate sides 42a and 44a which converges to a point of a similar configuration to the upper fixed entrance track section. A movable lower switch track section 50 comprising four track segments or sectors 52, 52 and 54, 54 arranged in pairs straddle the middle fixed track sections in the manner illustrated and in opposing limit positions define with a fixed track section a continuous trackway to direct DIPs to one of the four discharge stations. Thus, the track segments 52 have confronting arcuate walls 52a, 52a conforming to the contour of the arcuate sides 42a, 42a of the lower fixed track segments 42. Likewise the track sections 54, 54 have confronting arcuate faces 54a, 54a conforming to the curvature of the arcuate faces 44a of segments 44.

The limit position for the movable trackways is determined by engagement of confronting side walls of the movable track segments and the fixed track sections 22 and 40. (See FIGS. 3 and 4)

The movable track sections are supported for lateral transverse movement in the switch track housing and each includes a carriage supporting the track sectors comprising a plate member having depending legs at opposite ends which confront and are engageable by the actuator rods of the piston cylinder actuators. Thus, the support mechanism for the lower movable track section 50 is best shown in FIG. 6 and includes the elongated plate 51 which slides in the gap below top plate 55 and legs 57, 57 depending from opposite ends of plate 51. Note actuator rods for the piston cylinder actuators are mounted to engage the legs and thereby effect actuation of the movable tracks in the manner described and shown. Note also that the track sectors and fixed track elements are configured so that when the arcuate faces engage, the tip sections define a trackway path having generally the same width as the main trackway T to ensure free, fast movement of DIPs through the system. The configuration and mounting arrangement for upper movable track section 28 is the same as that described for the lower movable track section.

A traffic block 60 is disposed below the lower track section and has, as illustrated, an upstanding central wall 62 and two outer walls 64, 64 defining a pair of channel ways 66 for a series of four traffic tracks 68. The traffic tracks 68, as illustrated, are in a fan-like array oriented and spaced in such a manner to form a continuous trackway with the movable and fixed upper and lower switch track assemblies in the manner illustrated, for example, in FIGS. 3 and 4 and as described in more detail below. Each traffic track 68 has an emitter-detector 69 which senses when a DIP passes through the switching station and enters a cartridge at the discharge station. The emitter-detectors are operatively connected through the logic circut to stop pin 86 and are operative to actuate the pin 86 to an extended position blocking movement of DIPs to the switching station if DIPs signalled by the scanner do not pass over an emitter-detector. This arrangement, therefore, senses jamming in the system. The emitter-detectors 69 also count DIPs passing through the system which count is shown on digital display 71 on the front panel.

An output adaptor assembly 70 is mounted on the panel below the traffic block 60 which has, as illustrated, four elongated channels 72 formed therein which generally align with the traffic tracks 68. These channels are of a configuration to support four magazines or cartridges C in the array illustrated in FIG. 2. The output adaptor assembly 70 includes a series of cam actuators 74 mounted within slotted openings 76. As illustrated, the cam actuators 74 project into the slotted opening and are engagable by a cartridge when mounted therein. Each cam actuator 74 is associated with a microswitch 80 which signals whether a tube or cartridge is in place or not. There are also four retention springs 82 mounted in the upper wall of each slotted opening which, as illustrated in FIG. 5, bear against the inner terminal end of a cartridge C when it is seated in place. This spring functions 82 to hold the cartridges in place. The microswitch 80 has an associated circuit board 84 which is tied in with the logic circuit and which functions to permit passage of DIP devices to a given discharge station only when a cartridge is properly positioned in place to receive DIP devices.

The retention springs 82 are offset to define a contact point 83 remote from its outer free end and has a bumper 85 formed on its free end which normally projects into the channel to block passage of DIPs by bearing against traffic track 68 (FIG. 5) when the channel is empty and does not have a cartridge for receiving DIPs. A set screw 87 is provided to selectively adjust bearing tension of leaf springs 82. Note the offset configuration of the spring serves to raise bumper 85 out of the path of flow of DIPs when a cartridge is in place at the discharge station.

The output adaptor assembly 70 includes an indicator lamp 90 for each discharge station which is normally on when there is no tube at the station. In the fixed entrance trackway a stop pin 86 is actuated to block passage of DIP devices to the switch track section when a jam-up occurs. The indicator lamps 90 change to a blinking mode when a given tube is filled to capacity to indicate to serve as indicia means for the operator to remove a filled cartridge and replace it with an empty one.

Figure 7:
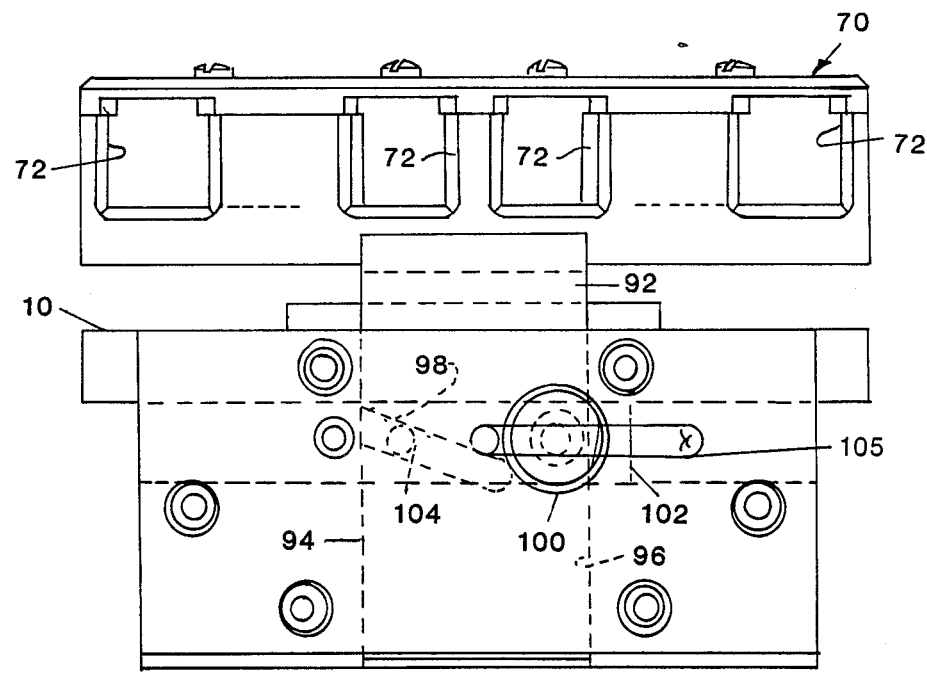
FIG. 7 is an end elevational view of the four socket carrier tube output adaptor assembly taken on the line 7—7 of FIG. 3 showing additional details of assembly and height adjustment means.

The entire adaptor assembly 70 is actuatable vertically relative to the fixed traffic blocks to facilitate correct centering of the cartridges or tubes and smooth flow of the DIP devices through the system to the cartridges or tubes mounted therein. Correct alignment requires that the center of the tube has to be in line with the traffic block in a common plane. To this end, the entire output adaptor sub-assembly is mounted for adjusting vertical movement on a cam bracket 92 of generally inverted L-shaped configuration, the long leg 94 of the cam engaging in a slotted opening 96 in the switch assembly housing in the manner shown in FIGS. 5 and 7. The cam bracket 92 has an elongated slot 98 extending from one face thereof which is disposed angularly relative to the horizontal plane of the output adaptor assembly. An adjusting knob 100 is mounted on support bar 102 which carries a pin 104 riding in the angled slot 98. Movement of knob 100 laterally in horizontal slot 105 effects up and down movement of the adaptor assembly through pin 104 and angled slot 98. The knob 100 can be locked in place when the desired setting has been realized. When the output adaptor assembly is in the proper vertical position relative to the traffic tracks, DIPs move freely from the traffic tracks to cartridges mounted in the adaptor assembly. One way of achieving this setting is by trial and error.

Figure 8:
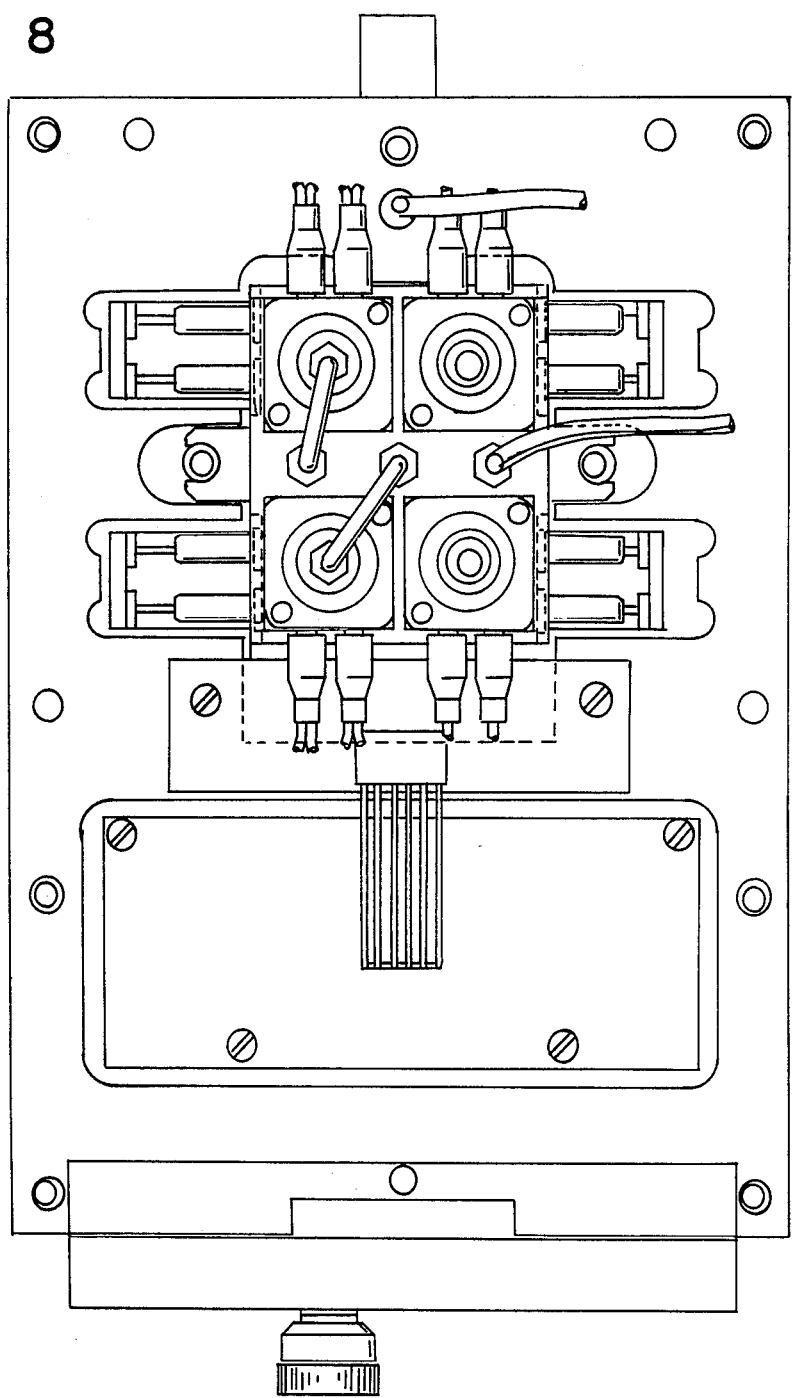
FIG. 8 is a bottom plan view of the switch track assembly and associated mounting details of the associated output adaptor assembly.

Means are provided for actuating the switch track assemblies between opposing limit positions for selectively controlling movement of the DIP devices to one of the four discharge stations. To this end, in accordance with the present invention, a unitary actuator module assembly 110 is provided which is easy to assemble in the switch track housing and which does not require highly precision fits or tolerances to effect accurate displacement of the switch assemblies between the limit positions. The actuator module as best illustrated in FIGS. 8 and 9 includes an opposing pair of piston cylinders 112, 112a and 114, 114a for each switch track sub-assembly. The piston actuators 112d are normally biased to an inner retracted position by means of an internal coil spring such as 112c. The pistons are air-actuated to effect movement of the switch track assembly and actuation of the cylinders compresses the springs so that the springs return the actuators to a retracted position when pressure is exhausted.

The piston cylinder actuators are under the control of solenoid operated control valves, which in the embodiment illustrated in FIG. 9 are 3-way, 2-position valves. Thus, piston cylinder actuators 112 and 112a are connected through lines 120, 120a to valves 122, 122a. The valves as illustrated are connected to exhaust through line 124 and to an air pressure supply through line 126. Note the solenoids $S_1$, $S_2$, $S_3$ and $S_4$ for the valves are operatively connected to the logic circuit through lines 128 and 130.

Considering now briefly operation of the system and tracing specifically the travel of DIP devices to the various discharge stations and the energization and operation of the solenoids and valves controlling the switching mechanisms. The actuators for the switching trackways are under the control of the scanning unit through the preprogrammed logic circuit for each DIP device as it passes the scanning station. Accordingly, assume that the discharge station $S_{D1}$ is for DIPs which require further processing and the DIP passing the scanner requires a straightening operation, the scanner through the logic circuit signals de-energization of solenoids $S_1$, $S_2$, $S_3$ and $S_4$ to move switch track sections $S_{T1}$ and $S_{T2}$ to the right hand limit positions so that the movable track segments lie adjacent fixed track segments 22 and 42 to establish a continuous trackway from the fixed track section 22 to the first discharge station $S_{T1}$. Note from FIG. 9 that de-energization of solenoids $S_1$, $S_2$, $S_3$ and $S_4$ and 122 positions the valves so that piston cylinder and actuators 112a and 114a are connected through lines 120a to exhaust and the pressure side of the system is connected through line 120 to pressurize piston cylinder actuators 112 and 114 and move the segmental track sections to the righthandmost limit position as shown. If the scanner signals for a given DIP to be discharged to station $S_{D2}$, then solenoids $S_3$ and $S_4$ are energized which effects positioning of the upper trackway section to the right hand limit position and the lower trackway section to the left hand limit position.

The system illustrated schematically in FIG. 9 as viewed from the rear operates on three-way two-position solenoid valves. FIG. 10 illustrates a modification of the present system for achieving essentially the same operation of the switching track sections except that only two four-way, two-position valves are used in the system. Thus, the piston cylinder actuators 112 and 112a are connected through lines 160 and 162 to solenoid valve 164 and piston cylinder actuators 114 and 114a are connected through lines 166 and 168 to solenoid actuator 170. The solenoid valves are connected through lines 172 and 174 to exhaust and are connected to an air-pressure source via line 176.

While a particular embodiment of the invention has been illustrated and described herein, it is not intended to limit the invention and changes and modifications may be made therein within the scope of the following claims.

What is claimed is:

1. A switch track mechanism for selectively directing electronic components moving along and straddling a trackway to at least two discharge or accumulator stations comprising a fixed track section being formed by the trackway, said fixed track section straddled by the electronic components, a movable track section operatively associated with said fixed track section and disposed on opposite sides thereof, said movable track section straddled by the electronic components and operable between first and second limit positions, at least two accumulator stations downstream of said track sections and means for actuating the movable track section between predetermined first and second limit positions whereby electronic components may be directed from the trackway to a select one of the accumulator stations, said fixed track sections having two opposed first contact surfaces and said movable track section having two opposed second contact surfaces, one of the second contact surfaces confronting and engageable with one of the first contact surfaces, determining said first limit position, the other second contact surface confronting and engageable with the other first contact surface, determining said second limit position, accurate registry of said fixed and movable track sections at said limit positions being determined solely be engagement of said confronting track sections.

* * * * *